United States Patent [19]

Sonneborn

[11] Patent Number: 4,463,818
[45] Date of Patent: Aug. 7, 1984

[54] TILT CAB TRUCK IN WHICH THE CAB IS PARTIALLY SUPPORTED BY THE TILTING CYLINDER WHILE IN THE DRIVE POSITION

[75] Inventor: Lamburtus J. Sonneborn, Oldenzaal, Netherlands

[73] Assignee: Applied Power Inc., Milwaukee, Wis.

[21] Appl. No.: 415,232

[22] Filed: Sep. 7, 1982

[51] Int. Cl.³ .............................................. B62D 33/06
[52] U.S. Cl. .................................. 180/89.15; 60/388; 60/413; 91/390; 296/35.1
[58] Field of Search ............... 180/89.15, 89.14, 89.13, 180/902; 60/413, 388; 91/363 R, 363 A, 390; 296/35.1

[56] References Cited

U.S. PATENT DOCUMENTS

| Re. 29,938 | 3/1979 | Knutson | 180/89.15 |
| 3,054,260 | 9/1962 | Dickinson et al. | 91/390 X |
| 3,853,368 | 12/1974 | Eichelsheim | 180/89.14 |
| 4,327,810 | 5/1982 | Jorda | 180/89.15 |
| 4,359,867 | 11/1982 | Swanson | 60/413 |

Primary Examiner—David M. Mitchell
Assistant Examiner—Mitchell J. Hill
Attorney, Agent, or Firm—John J. Byrne; Bradford E. Kile

[57] ABSTRACT

Disclosed is a tilt cab truck in which the weight of the cab is partially supported by the tilting cylinder while the cab is in the over-the-road position. A fluid-by-pass circuit is provided to permit the cab to perform limited up-and-down movement relative to the frame of the truck.

8 Claims, 2 Drawing Figures

TILT CAB TRUCK IN WHICH THE CAB IS PARTIALLY SUPPORTED BY THE TILTING CYLINDER WHILE IN THE DRIVE POSITION

FIELD OF THE INVENTION

This invention relates to tilt-cab trucks. In particular, it relates to the suspension and shock absorber system for the cab of a tilt cab truck.

BACKGROUND OF THE PRIOR ART

A tilt-cab truck is known from Dutch patent application No. 72/15364 in which the system for tilting the vehicle cab from and into the drive position includes at least one double-acting hydraulic piston-cylinder device, a pump, a reservoir for the hydraulic fluid, and a control valve. The ends of the piston-cylinder device are pivotally connected to the vehicle's cab and to the vehicle's chassis, respectively, and there is a by-pass connection between the cylinder spaces on either side of the piston when the latter is in the region of its innermost position (corresponding the drive position of the cab). The by-pass connection permits the piston and therefore the cab when in the drive position, to perform a limited reciprocating movement while the pump is inoperative.

With tilt-cab trucks such as the one disclosed in the above-mentioned Dutch application, the tiltable cab is supported by springs while in the drive position. Due to the presence of the by-pass connection between the two cylinder spaces in the innermost piston position, the piston is permitted to follow the up and down elastic movements of the cab relative to the chassis, occurring during driving, with a corresponding inward and outward sliding movement relative to the cylinder. However, the tilt cylinders are no longer "on line" when the cab is in the over-the-road position, and the entire weight of the cab must be supported by the springs and/or other suspension and shock absorber elements.

OBJECTS OF THE INVENTION

It is a general object of the invention to provide a tilt cab truck similar to the one described in the abovementioned patent application, but in which the tilt cylinders partially support the cab while it is in its over-the-road position.

It is another object of the invention to provide such a tilt cab truck in which the tilting mechanism also performs the functions of elastic and shock-absorbing cab support.

Other objects and advantages of the present invention will become apparent from the detailed description of a preferred embodiment thereof given hereinafter.

BRIEF SUMMARY OF THE INVENTION

The invention is a tilt cab truck in which the cylinder space under the piston is connected to an accumulator, an adjustable restriction is provided in the by-pass connection and/or in the connection conduit to the accumulator, and the control valve has, in addition to a position for tilting and a position for returning to the drive position, a third position in which the feed passages to the cylinder spaces on either side of the piston are disconnected from the pump and the reservoir.

There are different ways for bringing the control valve into the third, or drive position. Of course this may be done manually, but it also may be done automatically—e.g., at the end of a tilting movement back to the drive position. During driving, hydraulic fluid is permitted to flow from the accumulator towards the cylinder space under the piston in order to allow the cabin the carry out an upward elastic movement, while, when the cabin falls back under the force of gravity, hydraulic fluid is permitted to flow from that space towards the accumulator. Accordingly, the adjustable restriction has a shock dampening effect.

DETAILED DESCRIPTION OF THE PRESENTLY PREFERRED EMBODIMENT

Figure 1:
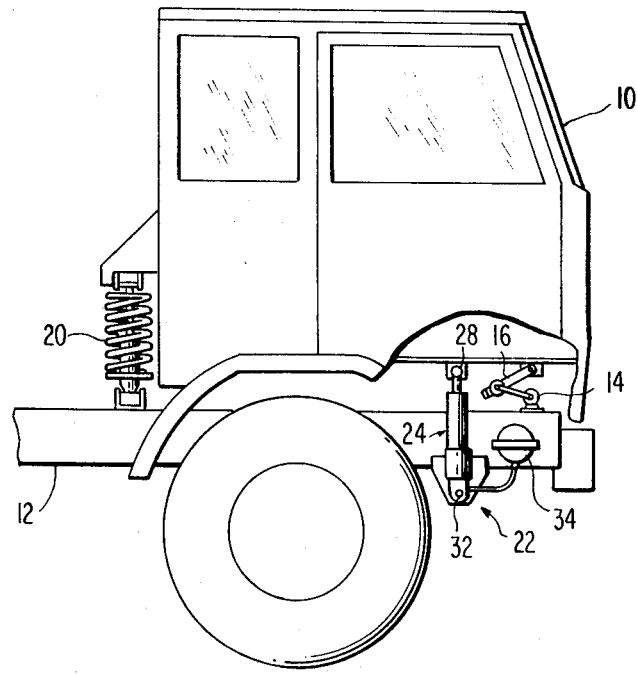
FIG. 1 is a schematic side view of the front portion of a motor vehicle having a tiltable cabin, and a tilting device according to the invention.

The drawings illustrate a tilt cab truck in which a tiltable cabin 10 is mounted on a vehicle chassis 12. The cabin 10 is tiltable in the forward direction around a shaft 14 situated in the front portion of the chassis 12. The connection between the cabin 10 and the shaft 14 is constituted at both sides of the vehicle by a toggle-lever 16 which acts as a spring permitting a certain up and down movement of the cabin 10 relative to the chassis 12 during driving. A bracket 18 is mounted on each side of the cabin 10, and, the back end of the cabin 10 rests on one or more spring devices 20 supported by the chassis 12.

Reference number 22 indicates the hydraulic tilting device, which includes a piston cylinder assembly 24. The upper piston rod end 26 of the piston rod assembly 24 is pivotally connected at 28 to the cabin 10, and the lower end of the cylinder 30 is pivotally connected at 32 to the chassis 12. Preferably, a similar piston cylinder assembly is provided at each side of the cabin 10.

FIG. 1 also shows an accumulator 34 connected to the cylinder 30. The accumulator 34 will be discussed further with reference to FIG. 2.

Figure 2:
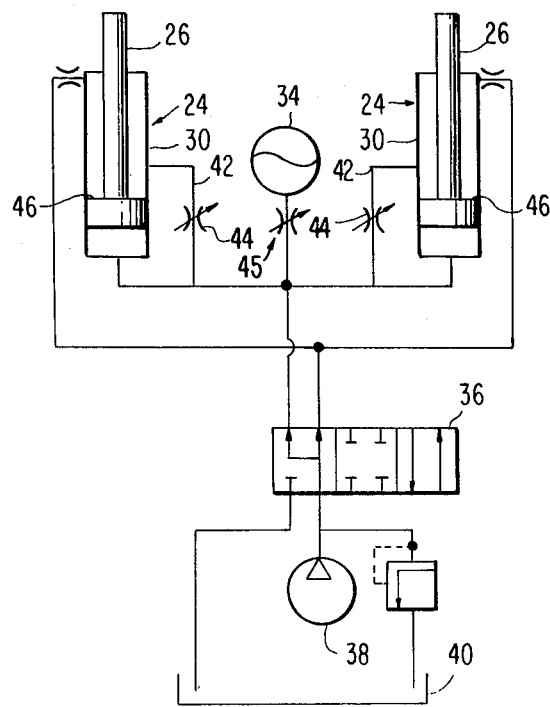
FIG. 2 shows a hydraulic diagram of the tilting device in simplified form.

In the hydraulic diagram of FIG. 2, both piston cylinder assemblies 24 of the hydraulic tilting device 22 are operatively connected to a hydraulic control valve 36, a hydraulic pump 38, and a reservoir 40 for the hydraulic fluid. Both piston cylinder assemblies 24 are provided with a by-pass conduit 42 containing a restriction 44. When the pistons 46 assume their retracted positions (corresponding to the drive position of the cabin 10), the bypass conduits connect the chambers below and above the pistons 46. Accordingly, the pistons 46 and therefore the cabin 10 are permitted to carry out restricted up and down movements, during which hydraulic fluid is displaced through the bypass conduits 42.

The hydraulic control valve 36 has three positions—namely a position for tilting the cabin 10 forwardly, a position for returning the cabin 10 from the forwardly tilted position, and a drive, or over-the-road, position. In FIG. 2, the control valve 36 is in its most rightward position, which is its tilting position. If the pump 38 is actuated manually or through an air motor while the hydraulic control valve 36 is in this position, hydraulic pressurized fluid is supplied to both sides of the pistons 46 of both piston cylinder assemblies 24. Because of the difference in effective piston areas above and below the pistons, the pistons 46 move outwardly, causing the cabin 10 to rotate around the tilting shaft 14 and causing the cabin 10 to lift off the spring device 20.

Tilting the cabin 10 backwards to the drive position as shown in FIG. 1 is achieved by sliding the control valve 36 to its most leftward position. In that position of the control valve 36, hydraulic fluid is supplied only to the piston rod sides of the cylinder 30, and the spaces below the piston 46 are communicated with the reservoir 40. As soon as the pistons 46 have retracted so far that the spaces above and below the pistons 46 have been connected through the by-pass conduits 42, the pump 38 may be turned off. Due to the effect of the by-pass conduits 42, the cabin 10 then continues to move further downwardly under the force of gravity towards its rest position, in which the cabin weight is balanced by the spring device 20 and the toggle lever 16.

Up to this point, the operation of the tilting device as shown corresponds to that of the device according to the earlier mentioned Dutch patent application. According to the present invention, however, the tilting device now additionally acts as an elastic support for the cabin 10 in the drive position. The achieve this result, the hydraulic control valve 36 has a third position which is a middle position in the embodiment shown. In the third position, the supply of hydraulic fluid via the pump 38 to the cylinders 24 and the return of hydraulic fluid from the cylinders 24 to the reservoir 40 have both been disconnected.

At the end of the above-mentioned return tilting movement, the hydraulic control valve 36 is placed in the third position before the entire cabin weight is rested on the spring device(es) 20 and the toggle lever 16. Placing the hydraulic control valve 36 into the third position may be accomplished automatically—e.g., as a response to the decrease of the operating pressure prevailing in the tilting cylinders 30 to a suitable lower value (e.g., 50 bar) or when a predetermined cabin position has been reached. If the operator later desires to adjust the cabin height, this may be done by increasing or decreasing the quantity of hydraulic fluid in the system. It will be clear that this may be done by placing the control valve 36 in one of its extreme positions for a short time interval, and (if necessary) pumping additional fluid into the system via the pump 38 or draining a quantity of fluid from the system to the reservoir 40.

It will be recognized from the foregoing that the cabin weight in the drive position is borne at least partially by the piston cylinder assemblies 24. As has been said above, the by-pass conduits 42 permit a certain up and down movement of the pistons 46 in the cylinders 30 when the cabin is in its drive position. If the cabin 10 moves downwardly, more fluid is freed from the chambers below the pistons 46 than will fit in the chambers above the pistons 46 because of the rod volume. This fluid surplus is received in the accumulator 34, which is connected to the cylinders 30 below the pistons 46. If the cabin 10 moves upwardly, the reverse takes place. The fluid which then is necessary for "make-up" in the chambers below the pistons 46 is supplied by the accumulator 34 under the influence of the pressure prevailing therein in the gas space above the liquid. As indicated above, the connection conduit to the accumulator 34 may also contain an adjustable restriction 45.

The restrictions 44 in the by-pass conduits 42 are preferably adjustable, to permit the operator to vary the resistance to the passage of hydraulic fluid from the chambers below the pistons 46 to those above the pistons and vice versa. In any event, the restrictions 44 provide a certain resistance to passage of hydraulic fluid so that the elastic upward and downward movements of the cabin are dampened. In this manner the piston cylinder assemblies 24 simultaneously act as shock absorbers.

Caveat

While the present invention has been illustrated by a detailed description of a perferred embodiment thereof, it will be obvious to those skilled in the art that various changes in form and detail can be made therein without departing from the true scope of the invention. For that reason, the invention must be measured by the claims appended hereto and not by the foregoing preferred embodiments.

I claim:

1. An apparatus for tilting a vehicle cabin having a front and a rear section from and into the drive position, said apparatus comprising at least one piston and one cylinder, said piston being positioned in a bore of said cylinder to form an upper and lower cylinder chamber on either side of said piston in said cylinder, and said piston and cylinder forming a hydraulic circuit together with a pump, a reservoir for hydraulic fluid, and a control valve, and wherein the ends of said piston and said cylinder are pivotally connected to said cabin and to a vehicle chassis respectively, there being a by-pass connection between said cylinder chambers on either side of said piston when the latter is in the region of its innermost position corresponding to the drive position of said cabin, said by-pass connection permitting said piston and said cabin in the drive position to perform a limited reciprocating movement while said pump is inoperative, characterized in that said lower cylinder chamber is also operatively connected to an accumulator, and an adjustable restriction is present in a line connecting said cylinder and said accumulator, and said control valve has, in addition to a position for tilting and a position for returning to the drive position, a third position in which the fluid passages to the cylinder chamber on either side of the piston are disconnected from the pump and the reservoir.

2. The apparatus of claim 1 wherein said adjustable restriction is positioned in said by pass connection between said cylinder chambers.

3. The apparatus of claim 1 wherein said piston and cylinder assembly is double-acting.

4. An apparatus for tilting a vehicle cabin having a front and rear section from and into the drive position, said apparatus comprising at least one piston and one cylinder, said piston being positioned in a bore of said cylinder to form an upper and lower cylinder chamber on either side of said piston in said cylinder, and said piston and cylinder forming a hydraulic circuit together with a pump, a reservoir for the hydraulic fluid, and a control valve, and wherein the ends of said piston and cylinder assembly are pivotally connected to said cabin and to a vehicle chassis respectively, there being a by-pass connection between said cylinder chambers on either side of the piston when the latter is in the region of its innermost position corresponding to the drive position of the cabin, said by-pass connection permitting said piston and said cabin in the drive position to perform a limited reciprocating movement while the pump is inoperative, characterized in that said lower cylinder chamber is operatively connected to an accumulator and said control valve has, in addition to a position for tilting and a position for returning to the drive position, a third position in which the fluid passages to the cylinder chambers on either side of the piston are disconnected from the pump and the reservoir but the fluid passages remain connected to said accumulator so that said front section of said cabin is supported and suspended by said apparatus when said cabin is in the drive position.

5. A tilt-cab truck comprising:
(a) a chassis;
(b) a cab having a front and a rear section pivotally mounted on said chassis;
(c) at least one piston and one cylinder operatively connected to said chassis and to said cab to pivot said cab relative to said chassis, said piston being positioned in a bore of said cylinder to form an upper and lower cylinder chamber on either side of said piston;
(d) a pump operatively connected to said cylinder;
(e) a reservoir for storing hydraulic fluid operatively connected to said cylinder;
(f) a by-pass connection between said upper and lower chambers in said cylinder when said piston in said cylinder is in a region corresponding to the drive position of said cab, said by-pass connection permitting said piston and said cabin to perform a limited reciprocating movement when said cab is in the drive position and said pump is inoperative;
(g) a fluid conduit containing an adjustable restriction connecting said cylinder to an accumulator; and
(h) a control valve for controlling the passage of fluid to and from said cylinder and said pump and said reservoir, said control valve having, in addition to a position for tilting said cab and a position for returning said cab to the drive position, a third position in which said piston assembly is disconnected from said pump and said reservoir.

6. A tilt-cab as recited in claim 5 wherein said adjustable restriction is located in said by-pass connection.

7. A tilt-cab truck as recited in claim 5 wherein said piston assembly is double-acting.

8. A tilt-cab truck comprising:
(a) a chassis;
(b) a cab having a front and a rear section pivotally mounted on said chassis;
(c) at least one piston and one cylinder operatively connected to said chassis and to said cab to pivot said cab relative to said chassis, said piston being positioned in a bore of said cylinder to form an upper and a lower cylinder chamber on either side of said piston;
(d) a pump operatively connected to said cylinder;
(e) a reservoir for storing hydraulic fluid operatively connected to said cylinder;
(f) a by-pass connection between said upper and lower chambers in said cylinder when said piston in said cylinder is in a region corresponding to the drive position of said cab, said by-pass connection permitting said piston and said cabin to perform a limited reciprocating movement when said cab is in the drive position and said pump is inoperative;
(g) an accumulator operatively connected to the lower chamber of said cylinder; and
(h) a control valve for controlling the passage of fluid to and from said cylinder and said pump and said reservoir, said control valve having, in addition to a position for tilting said cab and a position for returning said cab to the drive position, a third position in which said cylinder is disconnected from said pump and said reservoir but said connection between said cylinder and said accumulator remains open so that said front section of said cabin is supported and suspended by said piston and cylinder when said cabin is in the drive position.

* * * * *